(12) United States Patent
Nonaka (10) Patent No.: US 11,321,948 B2
(45) Date of Patent: May 3, 2022

(54) APPEARANCE DETECTION THRESHOLD APPARATUS, METHOD, AND NON-TRANSITORY STORAGE MEDIUM

(71) Applicant: NEC CORPORATION, Tokyo (JP)

(72) Inventor: Tetsushi Nonaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 99 days.

(21) Appl. No.: 16/830,685

(22) Filed: Mar. 26, 2020

(65) Prior Publication Data

US 2020/0311436 A1 Oct. 1, 2020

(30) Foreign Application Priority Data

Mar. 27, 2019 (JP) .............................. JP2019-060653

(51) Int. Cl.
 *G06K 9/62* (2006.01)
 *G06V 20/52* (2022.01)
 (Continued)

(52) U.S. Cl.
 CPC ............ *G06V 20/52* (2022.01); *G06V 40/103* (2022.01); *G06V 40/169* (2022.01); *G06K 9/6215* (2013.01)

(58) Field of Classification Search
 CPC ........... G06K 9/00288; G06K 9/00268; G06K 9/00295; G06K 9/00228; G06K 9/00221;
 (Continued)

(56) References Cited

U.S. PATENT DOCUMENTS

2010/0054550 A1* 3/2010 Okada ................ G06K 9/00308
382/118
2011/0243398 A1* 10/2011 Suzuki ................ G06K 9/6255
382/118
(Continued)

FOREIGN PATENT DOCUMENTS

JP 2004-523848 A 8/2004
JP 2006-236255 A 9/2006
(Continued)

OTHER PUBLICATIONS

Communication dated Mar. 24, 2020 from Japanese Patent Office in JP Application No. 2019-060653.
(Continued)

*Primary Examiner* — Kenny A Cese
(74) *Attorney, Agent, or Firm* — Sughrue Mion, PLLC (57) ABSTRACT

The present invention provides a processing apparatus including: an image analysis unit configured to extract a plurality of types of feature values of a person detected from an image; a registration management unit configured to determine whether or not data of the detected person is stored in a storage unit in which the feature value of each of a plurality of persons is stored on the basis of the extracted feature value; a change determination unit configured to determine whether or not there is a change in appearance of the detected person on the basis of the feature value stored in the storage unit and the extracted feature value in a case where it is determined that the data of the detected person is stored; and a notification unit configured to give notice of a person determined to have a change in appearance.

8 Claims, 9 Drawing Sheets

(51) Int. Cl.
*G06V 40/10* (2022.01)
*G06V 40/16* (2022.01)

(58) Field of Classification Search
CPC ........... G06K 9/00302; G06K 9/00771; G06K 9/00275; G06K 9/00369; G06K 9/6215; G06T 2207/30201
See application file for complete search history.

(56) References Cited

U.S. PATENT DOCUMENTS

2014/0010415 A1* 1/2014 Kunieda ............ G06K 9/00268
382/118
2018/0204053 A1* 7/2018 Yokozeki .................. G06T 7/20

FOREIGN PATENT DOCUMENTS

| JP | 2016-85675 A | 5/2016 |
| JP | 2016-194759 A | 11/2016 |

OTHER PUBLICATIONS

Office Action dated Jun. 9, 2020 in Japanese Application No. 2019-060653.

* cited by examiner

| DETECTED PERSON DISCRIMINATION INFORMATION | DETECTION DATE AND TIME | FEATURE VALUE | | | | | |
|---|---|---|---|---|---|---|---|
| | | FACE | BODY SHAPE | GAIT | CLOTHES | BELONGINGS | ... |
| 000013981 | 20190301.13:15 | *** | *** | *** | *** | *** | ... |
| .... | .... | .... | .... | .... | .... | .... | .... |

☆LIST OF PERSONS HAVING CHANGE IN APPEARANCE

| INFORMATION BEFORE CHANGE | | INFORMATION AFTER CHANGE | | CHANGE DETAILS |
|---|---|---|---|---|
| IMAGE | IMAGING DATE AND TIME / IMAGING LOCATION | IMAGE | IMAGING DATE AND TIME / IMAGING LOCATION | |
| △ | 2019. 1.13 14:07 / ENTRANCE | △ | 2019. 1.13 14:38 / FRONT OF GATE 5 | GAIT |
| | 2019. 1.13 15:38 / ENTRANCE | | 2019. 1.13 15:58 / FRONT OF THIRD FLOOR TOILET | BELONGINGS |

PREVIOUS ▼ 2 3 4 5 ▲ NEXT

FIG. 9

APPEARANCE DETECTION THRESHOLD APPARATUS, METHOD, AND NON-TRANSITORY STORAGE MEDIUM

This application is based on Japanese patent application No. 2019-060653, the content of which is incorporated hereinto by reference.

BACKGROUND

Technical Field

The present invention relates to a processing apparatus, a processing method, and a program.

Related Art

Japanese Patent Application Publication No. 2006-236255 discloses a technology of detecting a suspicious person who performs abnormal behavior by tracking a person captured in an image, computing a flow line, and collating the computed flow line with a flow line indicating abnormal behavior.

SUMMARY

A feature of a suspicious person is not limited to the flow line abnormality disclosed in Japanese Patent Application Publication No. 2006-236255, and there are various features. If the types of features which can be used for detecting a suspicious person increase, detection accuracy of the suspicious person improves.

The present invention is to provide a technology of detecting a suspicious person by a method which is not in the related art.

In one example embodiment, there is provided a processing apparatus including: an image analysis unit configured to extract a plurality of types of feature values of a person detected from an image; a registration management unit configured to determine whether or not data of the detected person is stored in a storage unit in which the feature values of each of a plurality of persons are stored on the basis of the extracted feature value; and a change determination unit configured to determine whether or not there is a change in appearance of the detected person on the basis of the feature value stored in the storage unit and the extracted feature value in a case where it is determined that the data of the detected person is stored.

In another example embodiment, there is provided a processing method executed by a computer, the method including: extracting a plurality of types of feature values of a person detected from an image; determining whether or not data of the detected person is stored in a storage unit in which the feature values of each of a plurality of persons are stored on the basis of the extracted feature value; and determining whether or not there is a change in appearance of the detected person on the basis of the feature value stored in the storage unit and the extracted feature value in a case where it is determined that the data of the detected person is stored.

In still another example embodiment, there is provided a program for causing a computer to function as: an image analysis unit configured to extract a plurality of types of feature values of a person detected from an image; a registration management unit configured to determine whether or not data of the detected person is stored in a storage unit in which the feature values of each of a plurality of persons are stored on the basis of the extracted feature value; and a change determination unit configured to determine whether or not there is a change in appearance of the detected person on the basis of the feature value stored in the storage unit and the extracted feature value in a case where it is determined that the data of the detected person is stored.

The present invention can realize a technology of detecting a suspicious person by a method which is not in the related art.

BRIEF DESCRIPTION OF THE DRAWINGS

The above and other objects, advantages and features of the present invention will be more apparent from the following description of certain preferred example embodiments taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the example embodiments illustrated for explanatory purposes.

The present inventor focuses on "change in appearance" which is one of the features of a suspicious person. For example, a change in appearance caused by disguise (a face change, a body shape change, a clothes change, a belongings change, or the like), a change in appearance caused by hiding something in clothes (a body shape change, a gait change, a belongings change, or the like), a change in appearance caused by leaving a suspicious object (a belongings change or the like), or the like is included. A processing apparatus according to the present example embodiment has a function of detecting a person having a change in appearance among an unspecified large number of persons captured in an image. Hereinafter, details will be described.

First, an example of a hardware configuration of the processing apparatus will be described. Each functional unit included in the processing apparatus of the present example embodiment is configured by any combination of hardware and software of any computer based on a central processing unit (CPU), a memory, a program loaded in the memory, a storage unit (in addition to the program stored in advance from a stage of shipping the apparatus, a program downloaded from a storage medium such as a compact disc (CD) or a server on the internet) such as a hard disc storing the program, and a network connection interface. Those skilled in the art understand that there are various modification examples to a realization method thereof and the apparatus.

Figure 1:
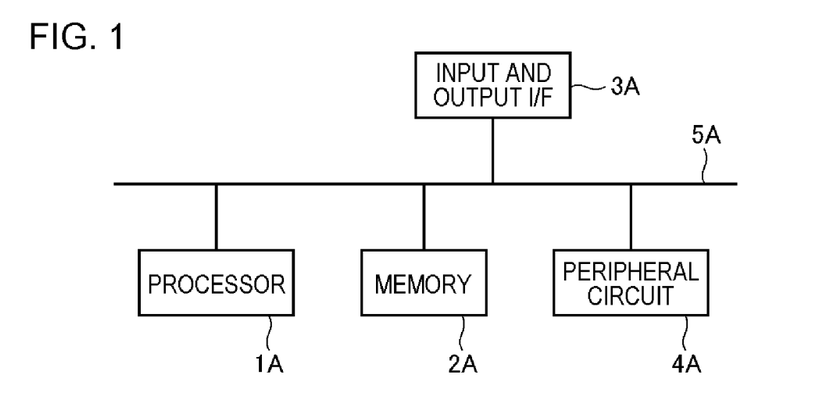
FIG. 1 is a diagram illustrating an example of a hardware configuration of a processing apparatus according to the present example embodiment.

FIG. 1 is a block diagram illustrating a hardware configuration of the processing apparatus. As illustrated in FIG. 1, the processing apparatus includes a processor 1A, a memory 2A, an input and output interface 3A, a peripheral circuit 4A, and a bus 5A. The peripheral circuit 4A includes various modules. The processing apparatus may not include the peripheral circuit 4A. It should be noted that, the processing apparatus may be configured by a plurality of apparatuses physically and/or logically separated, or may be configured by a single apparatus physically and/or logically integrated. In a case where the processing apparatus is configured by the plurality of apparatuses physically and/or logically separated, each of the plurality of apparatuses can include the above hardware configuration.

The bus 5A is a data transmission path through which the processor 1A, the memory 2A, the peripheral circuit 4A and, the input and output interface 3A transmit and receive data to and from one another. The processor 1A is an arithmetic processing apparatus such as a CPU or a graphics processing unit (GPU), for example. The memory 2A is a memory such as a random access memory (RAM) or a read only memory (ROM), for example. The input and output interface 3A includes an interface for obtaining information from an input apparatus, an external apparatus, an external server, an external sensor, a camera, and the like and an interface for outputting information to an output apparatus, the external apparatus, the external server, and the like. The input apparatus is, for example, a keyboard, a mouse, a microphone, a physical button, a touch panel, or the like. The output apparatus is, for example, a display, a speaker, a printer, a mailer, or the like. The processor 1A can output a command to each module and perform arithmetic based on the arithmetic result thereof.

Figure 2:
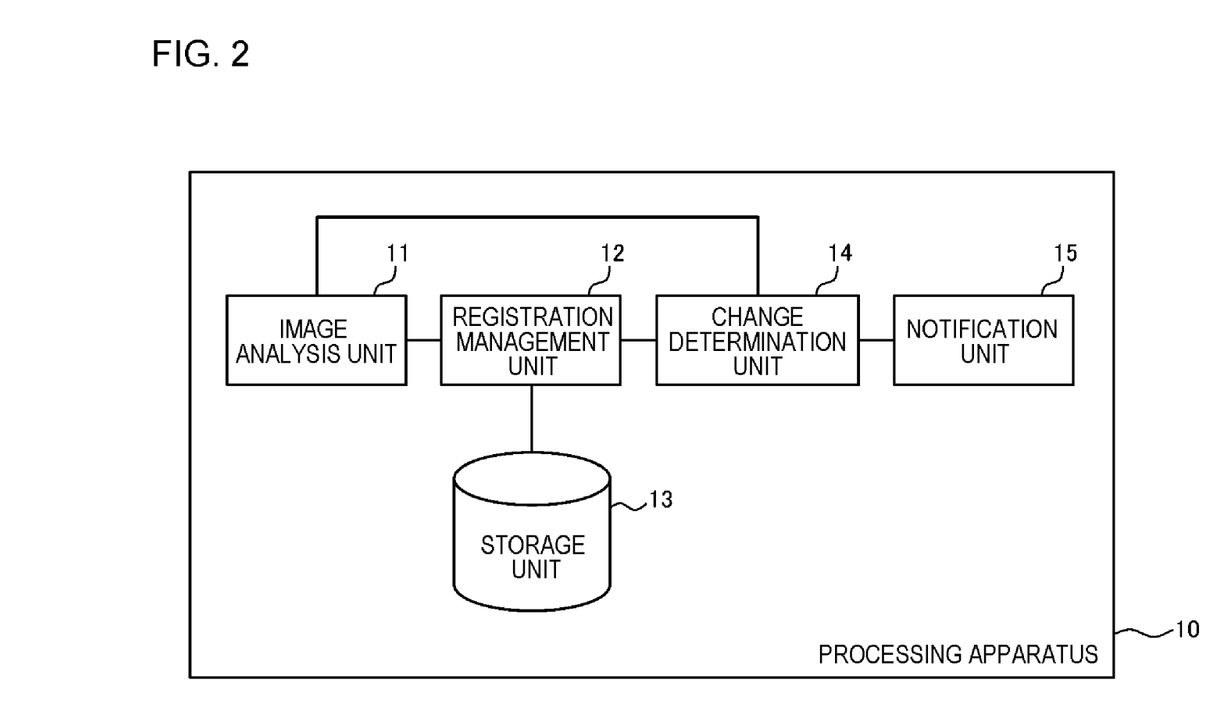
FIG. 2 is an example of a functional block diagram of the processing apparatus according to the present example embodiment.

Next, a functional configuration of a processing apparatus 10 will be described. FIG. 2 illustrates an example of a functional block diagram of the processing apparatus 10. As illustrated, the processing apparatus 10 includes an image analysis unit 11, a registration management unit 12, a storage unit 13, a change determination unit 14, and a notification unit 15. It should be noted that, the processing apparatus 10 may not include the storage unit 13. In this case, an external apparatus configured to be able to communicate with the processing apparatus 10 includes the storage unit 13.

The image analysis unit 11 detects a person from an image and extracts a plurality of types of feature values of the detected person. The plurality of types of feature values can be detected from the image, include, for example, a feature value of a face, a feature value of a body shape, a feature value of clothes, a feature value of a gait, a feature value of belongings, and the like, and are not limited thereto. Since a means which detects a person from the image and a means which extracts feature values are widely known, description will not be repeated.

On the basis of the feature value extracted by the image analysis unit 11, the registration management unit 12 determines whether or not data of a person detected by the image analysis unit 11 is stored in the storage unit 13 in which feature values of each of a plurality of persons are stored. In a case where it is determined that the data of the person detected by the image analysis unit 11 is not stored in the storage unit 13, the registration management unit 12 newly issues detected person discrimination information (for example, serial number) for discriminating each person detected by the image analysis unit 11 and registers the newly issued detected person discrimination information and the feature value extracted by the image analysis unit 11 in association with each other in the storage unit 13.

Figure 3:
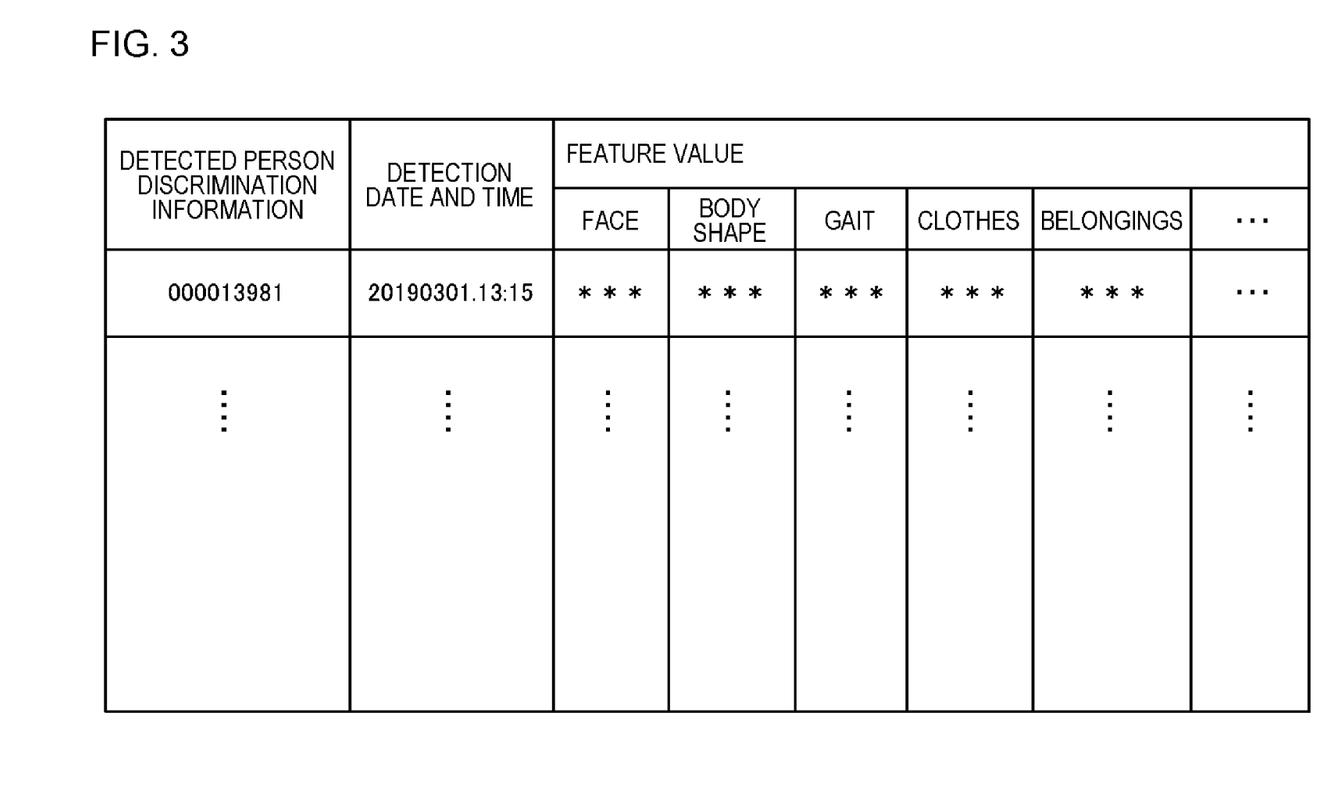
FIG. 3 is a diagram schematically illustrating an example of information processed by the processing apparatus according to the present example embodiment.

FIG. 3 is a diagram schematically illustrating an example of information stored in the storage unit 13. In the illustrated example, detected person discrimination information, detection date and time, and a feature value of each person extracted by image analysis by the image analysis unit 11 are registered in association with one another. The detection date and time is an imaging date and time of the image from which the registered feature value is extracted.

Here, a method in which the registration management unit 12 determines whether or not the data of the person detected by the image analysis unit 11 is stored in the storage unit 13 will be described. The registration management unit 12 can perform the above determination on the basis of similarity between the feature value extracted by the image analysis unit 11 and the feature value of each of the plurality of persons stored in the storage unit 13. Hereinafter, a specific example of the determination will be described.

For example, a search condition which is one of the following search conditions 1 to 3 or a search condition obtained by connecting any two or more of the following search conditions 1 to 3 with an OR operation may be stored in the storage unit 13.

In a case where data of a person (a target person) satisfying the search condition is stored in the storage unit 13, the registration management unit 12 may determine that the data of the person detected by the image analysis unit 11 is stored in the storage unit 13, and in a case where the data of the person satisfying the search condition is not stored in the storage unit 13, the registration management unit 12 may determine that the data of the person detected by the image analysis unit 11 is not stored in the storage unit 13.

(Search condition 1) "for a predetermined type of feature value, similarity with a feature value extracted by the image analysis unit 11 is equal to or more than a registration determination threshold value"

A specific example of the search condition 1 is, for example, any one of the following search conditions 1-1 to 1-6.

(Search condition 1-1) "for a feature value of a face, similarity with a feature value extracted by the image analysis unit 11 is equal to or more than a registration determination threshold value F1"

(Search condition 1-2) "for a feature value of a body shape, similarity with a feature value extracted by the image analysis unit 11 is equal to or more than a registration determination threshold value F2"

(Search condition 1-3) "for a feature value of a gait, similarity with a feature value extracted by the image analysis unit 11 is equal to or more than a registration determination threshold value F3"

(Search condition 1-4) "for a feature value of clothes, similarity with a feature value extracted by the image analysis unit 11 is equal to or more than a registration determination threshold value F4"

(Search condition 1-5) "for a feature value of belongings, similarity with a feature value extracted by the image analysis unit 11 is equal to or more than a registration determination threshold value F5"

(Search condition 1-6) "a condition obtained by connecting any two or more of (search condition 1-1) to (search condition 1-5) with an OR operation"

The registration determination threshold values F1 to F5 can be values according to the respective types of feature values. It should be noted that, the specific examples using the face, the body shape, the gait, the clothes, and the belongings are described here, but the search condition can be generated in the same manner in a case where other types of feature values are used.

(Search condition 2) "for all of two or more predetermined types of feature values, similarity with a feature value extracted by the image analysis unit 11 is equal to or more than a registration determination threshold value specified for each type of the feature value"

A specific example of the search condition 2 is a condition obtained by connecting any two or more of (search condition 2-1) to (search condition 2-5) with an AND operation.

(Search condition 2-1) "for a feature value of a face, similarity with a feature value extracted by the image analysis unit 11 is equal to or more than a registration determination threshold value L1 (L1<F1)"

(Search condition 2-2) "for a feature value of a body shape, similarity with a feature value extracted by the image analysis unit 11 is equal to or more than a registration determination threshold value L2 (L2<F2)"

(Search condition 2-3) "for a feature value of a gait, similarity with a feature value extracted by the image analysis unit 11 is equal to or more than a registration determination threshold value L3 (L3<F3)"

(Search condition 2-4) "for a feature value of clothes, similarity with a feature value extracted by the image analysis unit 11 is equal to or more than a registration determination threshold value L4 (L4<F4)"

(Search condition 2-5) "for a feature value of belongings, similarity with a feature value extracted by the image analysis unit 11 is equal to or more than a registration determination threshold value L5 (L5<F5)"

In addition, another specific example of the search condition 2 is a condition obtained by connecting a plurality of conditions, in which the search conditions 2-1 to 2-5 are combined in different combinations and connected with an AND operation, with an OR operation.

The registration determination threshold values L1 to L5 can be values according to the respective types of feature values. It should be noted that, the specific examples using the face, the body shape, the gait, the clothes, and the belongings are described here, but the search condition can be generated in the same manner in a case where other types of feature values are used.

(Search condition 3) "a similarity score computed on the basis of similarity with a feature value extracted by the image analysis unit 11 for each of the plurality of types of feature values is equal to or more than a score threshold value"

The registration management unit 12 executes the following processes 1 to 3 for computing a similarity score on each piece of data of the plurality of person stored in the storage unit 13.

(Process 1) "compute similarity with a feature value extracted by the image analysis unit 11 for each of the plurality of types of feature values"

(Process 2) "compute a product of the similarity computed for each type of the feature value and a weighting coefficient specified in advance for each type of the feature value"

(Process 3) "compute a similarity score by adding the products of the similarity computed for each type of the feature value and the weighting coefficient"

It should be noted that, the weighting coefficient of the feature value with higher accuracy capable of discriminating a person is larger. For example, a size of the weighting coefficient is "face feature value">"body shape feature value">"gait feature value">"clothes feature value">"belongings feature value".

Returning to FIG. 2, in a case where it is determined that the data of the person detected by the image analysis unit 11 is stored in the storage unit 13, the change determination unit 14 determines whether or not there is a change in appearance of the detected person on the basis of the feature value stored in the storage unit 13 and the feature value extracted by the image analysis unit 11.

In a case where similarity between the feature value extracted by the image analysis unit 11 (the feature value of the person detected by the image analysis unit 11) and the feature value of the person stored in the storage unit 13 is less than a change detection threshold value for at least one type of feature value among the plurality of types of feature values, the change determination unit 14 determines that there is a change in appearance of the person. On the other hand, in a case where similarity between the feature value extracted by the image analysis unit 11 (the feature value of the person detected by the image analysis unit 11) and the feature value of the person stored in the storage unit 13 is equal to or more than the change detection threshold value for all feature values among the plurality of types of feature values, the change determination unit 14 determines that there is no change in appearance of the person.

The change detection threshold value can be specified for each type of the feature value. It should be noted that, the change detection threshold value of each type of the feature value may be larger than the registration determination threshold value of each type of the feature values.

It should be noted that, in a case where the registration management unit 12 determines that the data of the person detected by the image analysis unit 11 is stored in the storage unit 13 because the data of a person satisfying the search condition 1 is stored in the storage unit 13, the change determination unit 14 can determine whether or not there is a change in appearance of the detected person on the basis of a second type of feature value different from a first type (a type with similarity equal to or more than the registration determination threshold value). That is, the change determination unit 14 determines whether or not similarity between the feature value of the person extracted by the image analysis unit 11 and the feature value of the person stored in the storage unit 13 is less than the change detection threshold value for the second type of feature value and thus determines whether or not there is a change in appearance of the person. In this manner, in a case where it is determined on the basis of the search condition 1 that the data of the person detected by the image analysis unit 11 is stored in the storage unit 13, it may be determined whether or not there is a change in appearance on the basis of the second type of feature value different from the first type.

It should be noted that, in a case where the registration management unit 12 determines that the data of the person detected by the image analysis unit 11 is stored in the storage unit 13 because the data of a person satisfying the search condition 2 or 3 is stored in the storage unit 13, the change determination unit 14 can determine whether or not there is a change in appearance of the detected person on the basis of all of the plurality of types of feature values. That is, the change determination unit 14 determines whether or not similarity between the feature value of the person extracted by the image analysis unit 11 and the feature value of the person stored in the storage unit 13 is less than the change detection threshold value for each of the plurality of types of feature values and thus determines whether or not there is a change in appearance of the person. In this manner, in a case where it is determined on the basis of the search condition 2 or 3 that the data of the person detected by the image analysis unit 11 is stored in the storage unit 13, it may be determined whether or not there is a change in appearance on the basis of all of the plurality of types of feature values.

Figure 8:
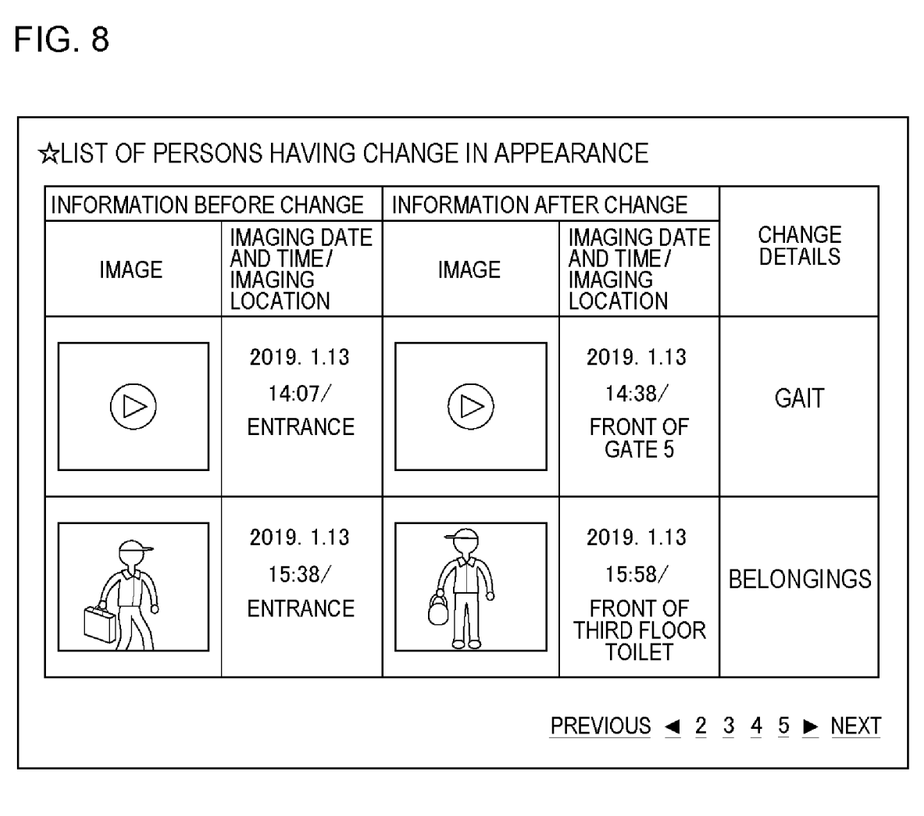
FIG. 8 is a diagram schematically illustrating an example of information output by the processing apparatus according to the present example embodiment.

The notification unit 15 gives notice of the person determined to have a change in appearance. For example, the notification unit 15 may generate and output a list of persons determined to have a change in appearance. FIG. 8 schematically illustrates an example of the list. As illustrated, the list may include information before and after a change and information indicating change details of the person determined to have the change in appearance. The information before and after the change may include information such as images before and after the change, imaging date and time and an imaging location of each image. The image may be a still image or a moving image. For example, in a case where a type of feature such as a gait of which details cannot be recognized in the still image changes, the notification unit 15 may include a moving image in the list as information before and after the change. In a case where a type of feature such as a face, a body shape, clothes, and belongings of which details can be recognized in the still image changes, the notification unit 15 may include the still image in the list as information before and after the change. The output of the list is realized through various output apparatuses such as a display, a projector, a printer, a mailer, and the like.

Figure 9:
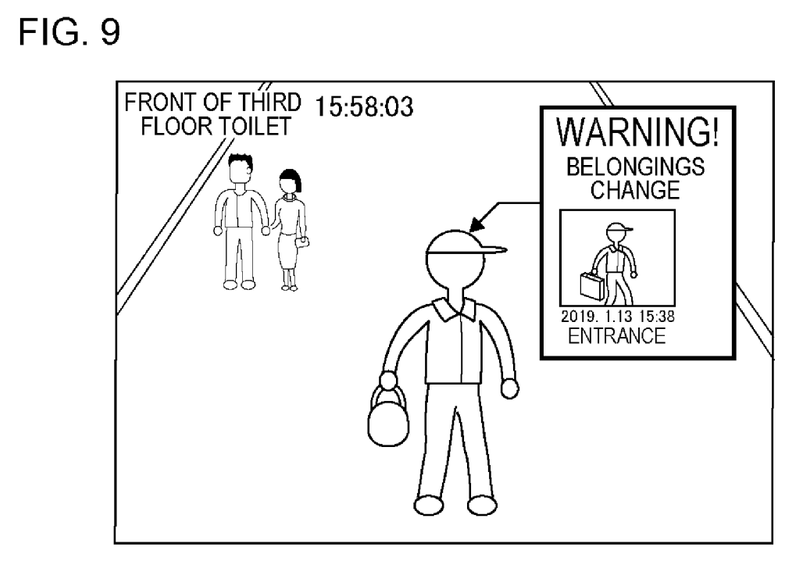
FIG. 9 is a diagram schematically illustrating another example of the information output by the processing apparatus according to the present example embodiment.

Further, in a case where the image analysis unit 11, the registration management unit 12, and the change determination unit 14 execute the process described above by real-time processing, if the change determination unit 14 determines that there is a change in appearance of a person, the notification unit 15 may accordingly execute a warning process of warning an operator. Examples of the warning process include an output of warning sound through a speaker, display of warning information on a display, projection of warning information by a projection apparatus, transmission of warning information to a predetermined notification destination by a mailer, lighting of a warning lamp, and the like, but are not limited thereto. For example, as illustrated in FIG. 9, the notification unit 15 may display the warning information on a display which displays an image captured by the camera in real time. As illustrated, the notification unit 15 may include information before a change and information indicating the change details in association with the person determined to have the change in appearance in the list. The information before the change may include information such as an image before the change, imaging date and time and an imaging location of the image. The image may be a still image or a moving image. For example, in a case where a type of feature such as a gait of which details cannot be recognized in the still image changes, the notification unit 15 may include a moving image in the information before the change. In a case where a type of feature such as a face, a body shape, clothes, and belongings of which details can be recognized in the still image changes, the notification unit 15 may include the still image in the information before the change.

It should be noted that, a notification means by the notification unit 15 is not limited to the example described above, and another means can also be adopted.

Figure 4:
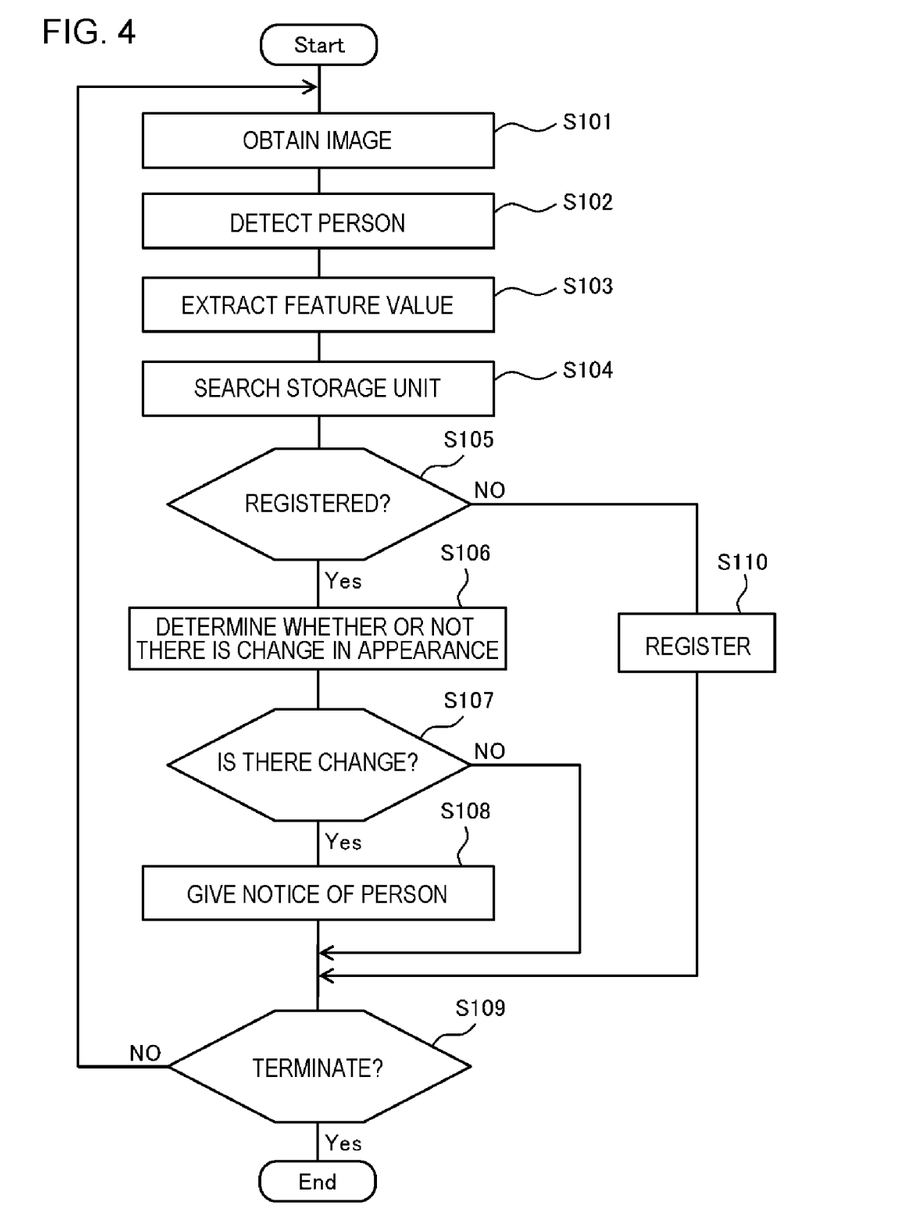
FIG. 4 is a flowchart illustrating an example of a flow of a process of the processing apparatus according to the present example embodiment.

Next, an example of a flow of a process of the processing apparatus 10 will be described with reference to the flowchart in FIG. 4.

When obtaining an image of a target to be processed (S101), the image analysis unit 11 detects a person from the image (S102), and extracts a plurality of types of feature values of the detected person (S103). The image analysis unit 11 may obtain an image generated by a camera by real-time processing.

Thereafter, the registration management unit 12 searches the storage unit 13 on the basis of the feature value extracted in S103, and checks whether or not data of the person detected in S102 is stored in the storage unit 13 (S104). Here, an example of a flow of the process in S104 will be described with reference to the flowchart in FIG. 5.

Figure 5:
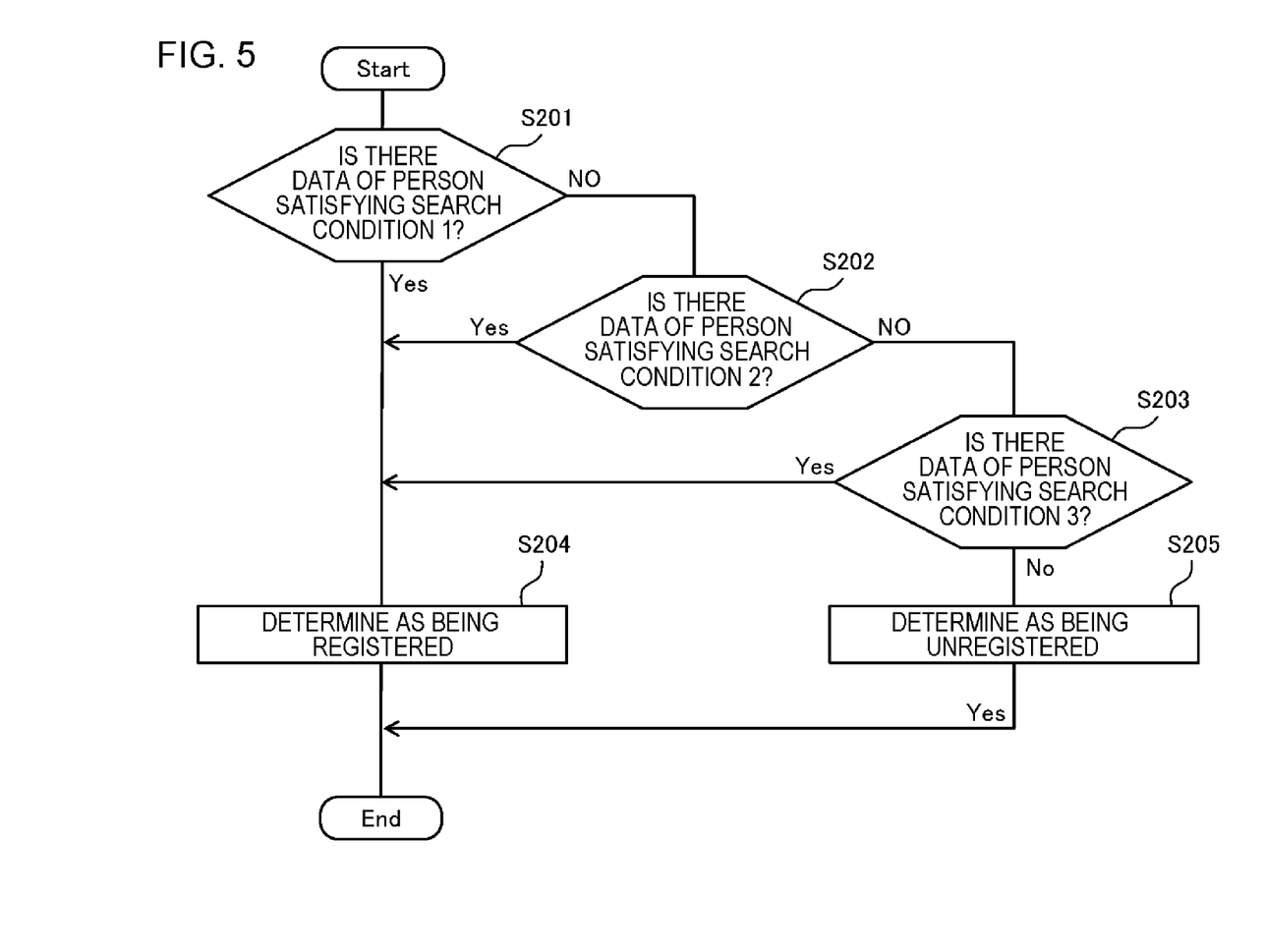
FIG. 5 is a flowchart illustrating another example of the flow of the process of the processing apparatus according to the present example embodiment.

First, in S201, the registration management unit 12 checks whether or not data of a person satisfying the search condition 1 described above is stored in the storage unit 13. In a case where the data of the person satisfying the search condition 1 is stored in the storage unit 13 (Yes in S201), the registration management unit 12 determines that the data of the person detected in S102 is stored in the storage unit 13 (S204). On the other hand, in a case where the data of the person satisfying the search condition 1 is not stored in the storage unit 13 (No in S201), the registration management unit 12 proceeds to S202.

In S202, the registration management unit 12 checks whether or not data of a person satisfying the search condition 2 described above is stored in the storage unit 13. In a case where the data of the person satisfying the search condition 2 is stored in the storage unit 13 (Yes in S202), the registration management unit 12 determines that the data of the person detected in S102 is stored in the storage unit 13 (S204). On the other hand, in a case where the data of the person satisfying the search condition 2 is not stored in the storage unit 13 (No in S202), the registration management unit 12 proceeds to S203.

In S203, the registration management unit 12 checks whether or not data of a person satisfying the search condition 3 described above is stored in the storage unit 13. In a case where the data of the person satisfying the search condition 3 is stored in the storage unit 13 (Yes in S203), the registration management unit 12 determines that the data of the person detected in S102 is stored in the storage unit 13 (S204). On the other hand, in a case where the data of the person satisfying the search condition 3 is not stored in the storage unit 13 (No in S203), the registration management unit 12 determines that the data of the person detected in S102 is not stored in the storage unit 13 (S205).

It should be noted that, the example of determining whether or not the data of the person detected in S102 is stored in the storage unit 13 on the basis of the search condition obtained by connecting the search condition 1 to the search condition 3 with an OR operation is described here. However, as described above, any one of the search condition 1 to the search condition 3 may be set as a search condition, and a search condition obtained by connecting any two of the search condition 1 to the search condition 3 with an OR operation may be set as the search condition. Further, an application order of the search conditions 1 to 3 is not limited to the example illustrated in FIG. 5.

Returning to FIG. 4, in a case where it is determined that the data of the person detected in S102 is not stored in the storage unit 13 (No in S105), the registration management unit 12 registers the feature value extracted in S103 in the storage unit 13. That is, the registration management unit 12 issues new detected person discrimination information, and stores the new detected person discrimination information and the feature value extracted in S103 in association with each other in the storage unit 13. Thereafter, if there is no input for terminating the process (No in S109), the processing apparatus 10 returns to S101 and repeats the process.

On the other hand, in a case where it is determined that the data of the person detected in S102 is stored in the storage unit 13 (Yes in S105), the change determination unit 14 determines whether or not there is a change in appearance of the person detected in S102 on the basis of the feature value stored in the storage unit 13 and the feature value extracted in S103 (S106). Here, an example of a flow of the process in S106 will be described with reference to the flowchart in FIG. 6.

Figure 6:
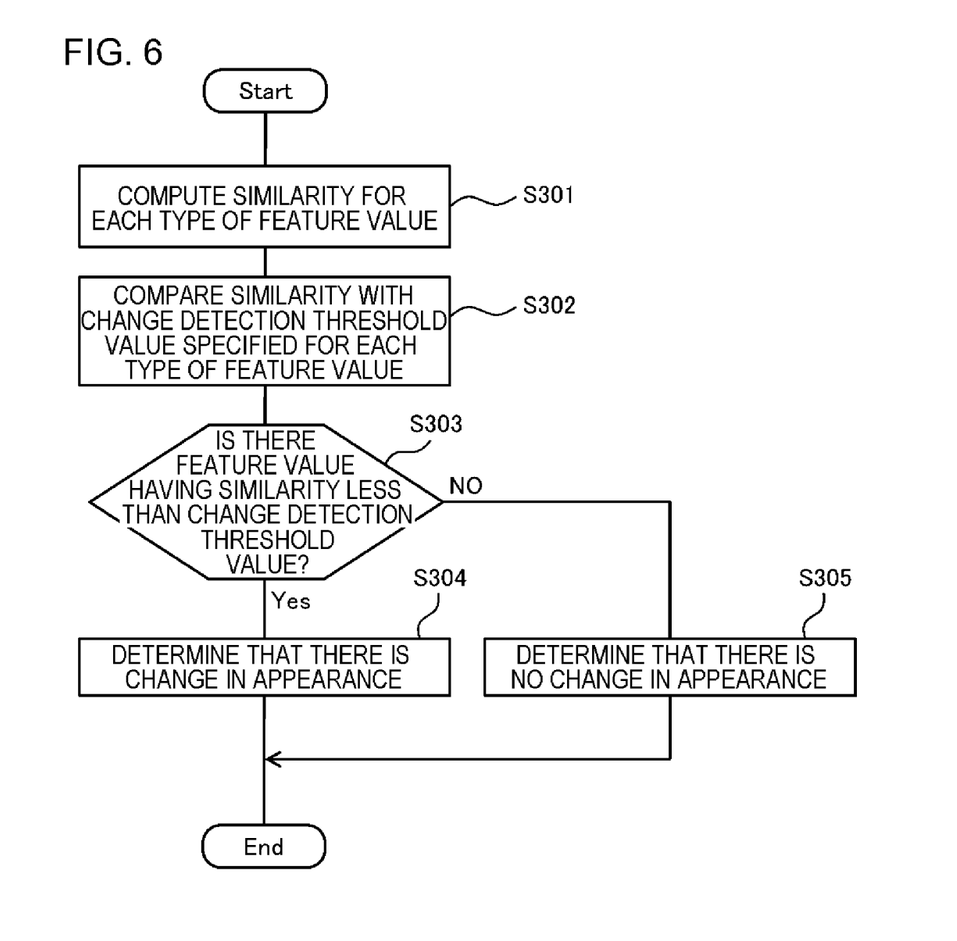
FIG. 6 is a flowchart illustrating still another example of the flow of the process of the processing apparatus according to the present example embodiment.

First, the change determination unit 14 computes similarity between the feature value extracted in S103 of the person detected in S102 and the feature value stored in the storage unit 13 of the person detected in S102 for each type of the feature value (S301). Next, the change determination unit 14 performs comparison in magnitude of the similarity computed for each type of the feature value with a change detection threshold value specified for each type of the feature value (S302).

In a case where there is a feature value having similarity less than the change detection threshold value (Yes in S303), the change determination unit 14 determines that there is a change in appearance of the person detected in S102 (S304). On the other hand, in a case where there is no feature value having similarity less than the change detection threshold value (No in S303), the change determination unit 14 determines that there is no change in appearance of the person detected in S102 (S305).

It should be noted that, in a case where, in S104 and S105, the registration management unit 12 determines that the data of the person detected by the image analysis unit 11 is stored in the storage unit 13 because the data of the person satisfying the search condition 1 (for the first type of feature value, similarity with the feature value extracted by the image analysis unit 11 is equal to or more than the registration determination threshold value) is stored in the storage unit 13, the change determination unit 14 may perform the process in FIG. 6 on the basis of similarity of each type of the feature value of the second type different from the first type. That is, since it is checked that the first type of feature value is sufficiently similar by the process by the registration management unit 12, the first type of feature value may be excluded from the processing target in FIG. 6. In this manner, a processing load on the computer can be reduced.

Returning to FIG. 4, when it is determined that there is a change in appearance of the person detected in S102 (Yes in S107), the notification unit 15 notifies the operator of the person (S108). For example, the notification unit 15 executes an output of warning sound through a speaker, display of warning information on a display, projection of warning information by a projection apparatus, transmission of warning information to a predetermined notification destination by a mailer, lighting of a warning lamp, and the like. The warning information may include the image of the person determined to have the change in appearance (for example, images before and after the change in appearance). Thereafter, if there is no input for terminating the process (No in S109), the processing apparatus 10 returns to S101 and repeats the process.

It should be noted that, in a case where it is determined that there is no change in appearance of the person detected in S102 (No in S107), if there is no input for terminating the process (No in S109), the processing apparatus 10 returns to S101 and repeats the process.

Figure 7:
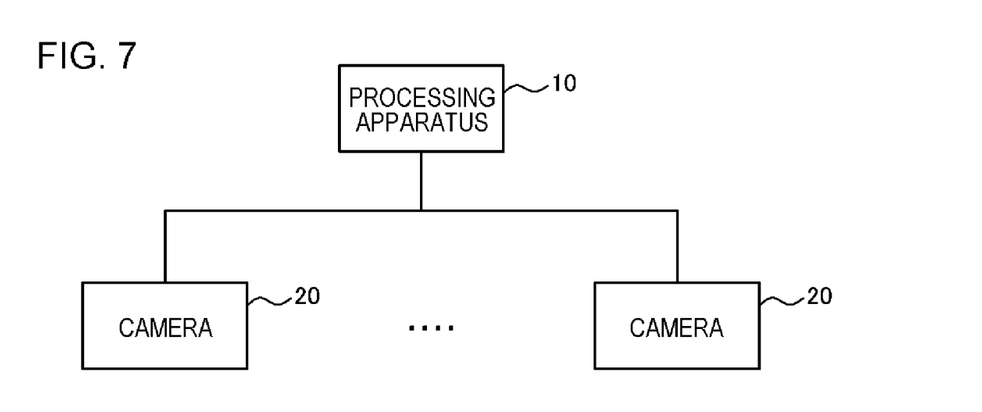
FIG. 7 is an example of a functional block diagram of a processing system according to the present example embodiment.

Next, FIG. 7 illustrates an example of a functional block diagram of a processing system including the processing apparatus 10. As illustrated, the processing system includes the processing apparatus 10 and a plurality of cameras 20. The processing apparatus 10 and the plurality of cameras 20 are communicably connected to each other by wire and/or wireless. The processing apparatus 10 obtains an image generated by each of the plurality of cameras 20 from each camera 20.

It should be noted that, in the present specification, "obtaining" includes at least one of "own apparatus receiving data stored in another apparatus or a storage medium (active obtaining)" according to a user input or according to a program instruction, for example, receiving data by requesting or inquiring the other apparatus or reading data by accessing to the other apparatus or the storage medium, "inputting data output from the other apparatus to the own apparatus (passive obtaining)" according to a user input or according to a program instruction, for example, receiving distributed (or transmitted, push-notified, or the like) data or obtaining by selecting the received data or information, and "generating new data by editing the data (conversion into text, rearranging data, extracting some pieces of data, changing a file format, or the like) to obtain the new data".

The camera 20 generates a moving image or a still image every predetermined time, and transmits the generated image to the processing apparatus 10. The camera 20 may transmit the generated image to the processing apparatus 10 by real-time processing, or may transmit the generated image to the processing apparatus 10 by batch processing.

The plurality of cameras 20 may be installed in the same facility. Examples of the facility include a station, an airport, a building, a park, a shopping mall, and the like, but are not limited thereto. By setting the camera 20 in a certain facility, the processing apparatus 10 can store data of a person who enters the facility in the storage unit 13 and can detect a person having a change in appearance while in the facility.

For example, one of the plurality of cameras 20 may be installed at an entrance of a certain facility and image a person who enters the facility. In this manner, the probability that data of the person who enters the facility can be registered in the storage unit 13 without omission is increased. In addition, one of the plurality of cameras 20 may be installed at an entrance and exit of a place which a suspicious person is likely to select so as to change appearance, such as a toilet or a changing room in the facility, and image a person who comes out from the place. In this manner, it is possible to image a person having a change in appearance and set the person as a target of determination by the change determination unit 14, with high probability.

Here, a modification example of the present example embodiment will be described. In the process of determining whether or not the data of the person detected by the image analysis unit 11 is stored in the storage unit 13, the registration management unit 12 may set all the data of the plurality of persons stored in the storage unit 13 as a collation target, and set some pieces of the data as the collation target. In a case where some pieces of the data are set as the collation target, the registration management unit 12 may narrow down the data as the collation target on the basis of the detection date and time (see FIG. 3). For example, the registration management unit 12 may set "data of a person having an elapsed time from the detection date and time within a reference time", "data of a person detected at the same date as the date of the determination process performed by the registration management unit 12", and the like as the collation target.

Another modification example of the processing apparatus 10 will be described. The processing apparatus 10 may not include the notification unit 15. Even in this case, at least, the processing apparatus 10 has a function of extracting a plurality of types of feature values of a person detected from an image (the image analysis unit 11), determining whether or not data of the detected person is stored in the storage unit 13 in which a feature value of each of the plurality of persons is stored on the basis of the extracted feature value (the registration management unit 12), and determining whether or not there is a change in appearance of the detected person on the basis of the feature value stored in the storage unit 13 and the extracted feature value in a case where it is determined that the data of the detected person is stored (the change determination unit 14).

As described above, according to the processing apparatus 10 of the present example embodiment, it is possible to detect a person having a change in appearance among an unspecified large number of persons captured in an image. For this reason, according to the processing apparatus 10, for example, it is possible to detect a suspicious person having a change in appearance caused by disguise (a face change, a body shape change, a clothes change, a belongings change, or the like), a suspicious person having a change in appearance caused by hiding something in clothes (a body shape change, a gait change, a belongings change, or the like), a suspicious person having a change in appearance caused by leaving a suspicious object (a belongings change or the like), or the like among an unspecified large number of persons captured in the image.

As an example, according to the processing apparatus 10, it is possible to detect a suspicious person having a change in body shape or gait by hiding something in clothes at a toilet at the customs of an airport, and the like from the unspecified large number of persons captured in the image. Further, according to the processing apparatus 10, it is possible to detect a suspicious person who leaves a suspicious object at a station or the like from the unspecified large number of persons captured in the image. In addition, according to the processing apparatus 10, in a shopping mall or the like, it is possible to detect a suspicious person having a change in body shape or clothes who leaves wearing a product after trying on the product in a fitting room, from the unspecified large number of persons captured in the image. Further, according to the processing apparatus 10, it is possible to detect a suspicious person who wears a mask and impersonates another person, from the unspecified large number of persons captured in the image. In addition, according to the processing apparatus 10, it is possible to detect a suspicious person having a change in gait by hiding a suspicious object in shoes from the unspecified large number of persons captured in the image.

Further, according to the processing apparatus 10 of the present example embodiment, it is possible to detect fraudulent behavior of a person who is not registered in advance by combining existing video analysis.

As described above, the present invention is described with reference to the example embodiments (and examples), but the present invention is not limited to the above example embodiments (and examples). Various modifications that can be understood by those skilled in the art can be made to the configuration and details of the present invention within the scope of the present invention.

A part or all of the example embodiments may also be described as the following appendixes, but are not limited to the following.

1. A processing apparatus including: an image analysis unit configured to extract a plurality of types of feature values of a person detected from an image; a registration management unit configured to determine whether or not data of the detected person is stored in a storage unit in which the feature values of each of a plurality of persons are stored on the basis of the extracted feature value; and a change determination unit configured to determine whether or not there is a change in appearance of the detected person on the basis of the feature value stored in the storage unit and the extracted feature value in a case where it is determined that the data of the detected person is stored.

2. The processing apparatus according to 1, further including a notification unit configured to give notice of a person determined to have a change in appearance.

3. The processing apparatus according to 1 or 2, in which in a case where it is determined that the data of the detected person is not stored, the registration management unit registers the extracted feature values in the storage unit.

4. The processing apparatus according to any one of 1 to 3, in which in a case where data of a target person having similarity with the extracted feature value equal to or more than a threshold value for a first type of the feature value is stored in the storage unit, the registration management unit determines that the data of the detected person is stored, and the change determination unit determines whether or not there is a change in appearance of the detected person on the basis of a second type of the feature value different from the first type.

5. The processing apparatus according to any one of 1 to 4, in which in a case where data of a target person having similarity with the extracted feature value equal to or more than a registration determination threshold value for all of two or more types of the feature values is stored in the storage unit, the registration management unit determines that the data of the detected person is stored, the registration determination threshold value being specified for each type of the feature value, in a case where for at least one type of the feature value among the plurality of types of feature values, similarity between the feature value included in the data of the target person and the extracted feature value is less than a change detection threshold value specified for each type of the feature value, the change determination unit determines that there is a change in appearance of the detected person, and the change detection threshold value of each type of the feature value is larger than the registration determination threshold value.

6. The processing apparatus according to any one of 1 to 5, in which the registration management unit, for each piece of data of the plurality of persons stored in the storage unit, computes similarity with the extracted feature value for each of the plurality of types of feature values, computes a product of the similarity computed for each type of the feature value and a weighting coefficient specified for each type of the feature value, computes a similarity score by adding the products computed for each type of the feature value, and determines that the data of the detected person is stored in a case where data of a target person having the similarity score equal to or more than a score threshold value is stored in the storage unit, and the change determination unit determines that there is a change in appearance of the detected person, in a case where for at least one type of the feature value among the plurality of types of feature values, similarity between the feature value included in the data of the target person and the extracted feature value is less than a change detection threshold value specified for each type of the feature value.

7. A processing method executed by a computer, the method including: extracting a plurality of types of feature values of a person detected from an image; determining whether or not data of the detected person is stored in a storage unit in which the feature values of each of a plurality of persons are stored on the basis of the extracted feature value; and determining whether or not there is a change in appearance of the detected person on the basis of the feature value stored in the storage unit and the extracted feature value in a case where it is determined that the data of the detected person is stored.

8. A program for causing a computer to function as: an image analysis unit configured to extract a plurality of types of feature values of a person detected from an image; a registration management unit configured to determine whether or not data of the detected person is stored in a storage unit in which the feature values of each of a plurality of persons are stored on the basis of the extracted feature value; and a change determination unit configured to determine whether or not there is a change in appearance of the detected person on the basis of the feature value stored in the storage unit and the extracted feature value in a case where it is determined that the data of the detected person is stored.

It is apparent that the present invention is not limited to the above example embodiment, and may be modified and changed without departing from the scope and spirit of the invention.

REFERENCE NUMERALS

1A: processor
2A: memory
3A: input and output I/F
4A: peripheral circuit
5A: bus
10: processing apparatus
11: image analysis unit
12: registration management unit
13: storage unit
14: change determination unit
15: notification unit

What is claimed is:

1. A processing apparatus comprising:
at least one memory configured to store one or more instructions; and
at least one processor configured to execute the one or more instructions to:
extract a plurality of types of feature values of a person detected from an image;
determine whether or not data of the detected person is stored in a storage unit, in which feature values of each of a plurality of persons are stored, on the basis of an extracted feature value from the extracted plurality of types of feature values; and
determine whether or not there is a change in appearance of the detected person on the basis of a feature value stored in the storage unit and the extracted feature value in a case where it is determined that the data of the detected person is stored,
wherein the processor is further configured to execute the instructions to determine that the data of the detected person is stored in the storage unit, in a case in which the extracted feature value is determined by the processor to satisfy at least one of a condition A and a condition B and is stored in the storage unit,
wherein the condition A indicates that for at least one type of feature value among a plurality of types of feature values, a similarity with the extracted feature value is equal to or more than a threshold value F,
wherein the condition B indicates that for at least two types of feature values among the plurality of types of feature values, a similarity with the extracted feature value is equal to or more than a threshold value L,
wherein the threshold value L is defined for each of the plurality of types of feature values,
wherein the threshold value F is defined for each of the plurality of types of feature values, and
wherein the threshold value F is more than the threshold value L.

2. The processing apparatus according to claim 1, wherein the processor is further configured to execute the one or more instructions to give notice of a person determined to have a change in appearance.

3. The processing apparatus according to claim 1, wherein the processor is further configured to execute the one or more instructions to register the extracted feature values in the storage unit in a case where it is determined that the data of the detected person is not stored.

4. The processing apparatus according claim 1, wherein the processor is further configured to execute the one or more instructions to:
determine whether or not there is a change in appearance of the detected person on the basis of a second type of feature value different from the at least one type of feature value.

5. The processing apparatus according to claim 1, wherein the processor is further configured to execute the one or more instructions to:
in a case where for the at least one type of feature value among the plurality of types of feature values, a similarity between the feature value included in the data of the target person and the extracted feature value is less than a change detection threshold value specified for each type of the feature value, determine that there is a change in appearance of the detected person, and
the change detection threshold value of each type of the feature value is larger than the threshold value L.

6. The processing apparatus according to claim 1, wherein the processor is further configured to execute the one or more instructions to:
compute a similarity with the extracted feature value for each of the plurality of types of feature values,
compute a product of the similarity computed for each type of the feature value and a weighting coefficient specified for each type of the feature values,
compute a similarity score by adding the products computed for each type of the feature values, and
determine that the data of the detected person is stored in a case where data of a target person having the similarity score equal to or more than a score threshold value is stored in the storage unit, and determine that there is a change in appearance of the detected person, in a case where for the at least one type of the feature values among the plurality of types of feature values, a similarity between the feature value included in the data of the target person and the extracted feature value is less than a change detection threshold value specified for each type of the feature value.

7. A processing method executed by a computer, the method comprising:

extracting a plurality of types of feature values of a person detected from an image;

determining whether or not data of the detected person is stored in a storage unit, in which feature values of each of a plurality of persons are stored, on the basis of an extracted feature value from the extracted plurality of types of feature values; and determining whether or not there is a change in appearance of the detected person on the basis of a feature value stored in the storage unit and the extracted feature value in a case where it is determined that the data of the detected person is stored, wherein determining that the data of the detected person is stored in the storage unit is in a case in which the extracted feature value is determined by the processor to satisfy at least one of a condition A and a condition B and is stored in the storage unit, wherein the condition A indicates that for at least one type of feature value among a plurality of types of feature values, a similarity with the extracted feature value is equal to or more than a threshold value F, wherein the condition B indicates that for at least two types of feature values among the plurality of types of feature values, a similarity with the extracted feature value is equal to or more than a threshold value L, wherein the threshold value L is defined for each of the plurality of types of feature values wherein the threshold value F is defined for each of the plurality of types of feature values, and wherein the threshold value F is more than the threshold value L.

8. A non-transitory storage medium storing a program for causing a computer to:

extract a plurality of types of feature values of a person detected from an image;

determine whether or not data of the detected person is stored in a storage unit, in which feature values of each of a plurality of persons are stored, on the basis of an extracted feature value from the extracted plurality of types of feature values; and determine whether or not there is a change in appearance of the detected person on the basis of a feature value stored in the storage unit and the extracted feature value in a case where it is determined that the data of the detected person is stored, wherein determining that the data of the detected person is stored in the storage unit is in a case in which the extracted feature value is determined by the processor to satisfy at least one of a condition A and a condition B and is stored in the storage unit, wherein the condition A indicates that for at least one type of feature value among a plurality of types of feature values, a similarity with the extracted feature value is equal to or more than a threshold value F, wherein the condition B indicates that for at least two types of feature values among the plurality of types of feature values, a similarity with the extracted feature value is equal to or more than a threshold value L, wherein the threshold value L is defined for each of the plurality of types of feature values, wherein the threshold value F is defined for each of the plurality of types of feature values, and wherein the threshold value F is more than the threshold value L.

* * * * *